(12) United States Patent
Falaschi et al.

(10) Patent No.: US 9,605,638 B2
(45) Date of Patent: Mar. 28, 2017

(54) FILTER FOR A FLUID INJECTION VALVE, FLUID INJECTION VALVE AND METHOD FOR PRODUCING A FILTER FOR A FLUID INJECTION VALVE

(71) Applicant: Continental Automotive GmbH, Hannover (DE)

(72) Inventors: Filippo Falaschi, Fauglia (IT); Ivano Izzo, Pisa (IT); Luca Matteucci, Pisa (IT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/895,055

(22) PCT Filed: Apr. 29, 2014

(86) PCT No.: PCT/EP2014/058700
§ 371 (c)(1),
(2) Date: Dec. 1, 2015

(87) PCT Pub. No.: WO2014/195064
PCT Pub. Date: Dec. 11, 2014

(65) Prior Publication Data
US 2016/0108878 A1  Apr. 21, 2016

(30) Foreign Application Priority Data
Jun. 4, 2013  (EP) .................................. 13170428

(51) Int. Cl.
*F02M 61/16* (2006.01)
*B01D 35/02* (2006.01)

(52) U.S. Cl.
CPC ........... *F02M 61/165* (2013.01); *B01D 35/02* (2013.01)

(58) Field of Classification Search
CPC .. F02M 61/165; F02M 61/167; F02M 61/168; F02M 2200/26; F02M 2200/27;
(Continued)

(56) References Cited

U.S. PATENT DOCUMENTS 5,335,863 A * 8/1994 DeGrace ............ F02M 51/0671
239/575
5,641,126 A * 6/1997 Nally .................... F02M 61/145
239/575
(Continued)

FOREIGN PATENT DOCUMENTS

DE  102007008863 A1  8/2008  ............. B23P 19/02
DE  102007049963 A1  4/2009  ............. F02M 57/00
(Continued)

OTHER PUBLICATIONS

European Search Report, Application No. 13170428.0, 5 pages, Sep. 12, 2013.
(Continued)

*Primary Examiner* — Darren W Gorman
(74) *Attorney, Agent, or Firm* — Slayden Grubert Beard PLLC

(57) ABSTRACT

A filter for a fluid injection valve includes a filter sleeve and a fastening element. The fastening element includes a fitting portion for fastening the filter in the fluid injection valve and a connection portion mechanically interacting with a first part of the filter sleeve for connecting the filter sleeve and the fastening element. The filter sleeve includes a second part arranged inside the fastening element and disposed at a distance from the fitting portion of the fastening element. A fluid injection valve and a method for producing the filter are also disclosed.

15 Claims, 2 Drawing Sheets

(58) Field of Classification Search
CPC ... F02M 2200/8053; F02M 2200/8061; F02M 2200/8092
See application file for complete search history.

(56) References Cited

U.S. PATENT DOCUMENTS

| | | | | |
|---|---|---|---|---|
| 6,019,128 | A * | 2/2000 | Reiter | F02M 61/165 |
| | | | | 137/549 |
| 6,135,094 | A * | 10/2000 | Okada | F02M 37/22 |
| | | | | 123/470 |
| 6,199,775 | B1 * | 3/2001 | Dallmeyer | F02M 37/22 |
| | | | | 123/470 |
| 9,200,604 | B2 | 12/2015 | Derenthal et al. | 123/445 |
| 2001/0032888 | A1 * | 10/2001 | McFarland | F02M 51/0664 |
| | | | | 239/5 |
| 2002/0104904 | A1 * | 8/2002 | McFarland | F02M 51/005 |
| | | | | 239/585.1 |
| 2007/0095745 | A1 * | 5/2007 | Sebastian | F02M 51/0667 |
| | | | | 210/439 |
| 2007/0227984 | A1 | 10/2007 | Wells et al. | 210/767 |

FOREIGN PATENT DOCUMENTS

| | | | | |
|---|---|---|---|---|
| WO | 01/57385 A2 | 8/2001 | | F02M 51/06 |
| WO | 2014/195064 A1 | 12/2014 | | F02M 61/16 |

OTHER PUBLICATIONS

International Search Report and Written Opinion, Application No. PCT/EP2014/058700, 9 pages, Jun. 27, 2014.

\* cited by examiner

FILTER FOR A FLUID INJECTION VALVE, FLUID INJECTION VALVE AND METHOD FOR PRODUCING A FILTER FOR A FLUID INJECTION VALVE

CROSS-REFERENCE TO RELATED APPLICATIONS

This application is a U.S. National Stage Application of International Application No. PCT/EP2014/058700 filed Apr. 29, 2014, which designates the United States of America, and claims priority to EP Application No. 13170428.0 filed Jun. 4, 2013, the contents of which are hereby incorporated by reference in their entirety.

TECHNICAL FIELD

The present disclosure relates to a filter for a fluid injection valve, a fluid injection valve and a method for producing a filter for a fluid injection valve.

BACKGROUND

Fluid injection valves are in widespread use, in particular for an internal combustion engine where they may be arranged in order to dose fuel into an intake manifold of the internal combustion engine or directly into the combustion chamber of a cylinder of the internal combustion engine.

Injection valves are manufactured in various forms in order to satisfy the various needs for the various combustion engines. Therefore, for example, their length, their diameter, and all the various elements of the injection valve being responsible for the way the fluid is dosed may vary in a wide range. In addition to that, injection valves can accommodate an actuator for actuating a needle of the injection valve, which may be, for example, an electromagnetic actuator or a piezoelectric actuator.

In order to enhance the combustion process in view of degradation of unwanted emissions, the respective injection valve may be suited to dose fluids under high pressures. The pressures may be in case of a gasoline engine, for example, in the range of up to 500 bar, and in case of a diesel engine, in the range of 2500 bar, and above.

In addition, in order to enhance the combustion process and/or to reduce the risk of malfunction, an injection valve normally comprises a fuel filter for filtering the fluid, and it also may comprise an adjusting member for adjusting the maximal load of a calibration spring of the injection valve. Filtering the fuel is necessary for keeping possible impurities of the fuel off from the needle and off from the injection nozzle. For these purposes it is known to provide a so-called adjusting fuel filter assembly comprising three parts: a frame, a bush, and a screen. Such an adjusting fuel filter assembly cooperates with a spring, which preloads the valve needle.

SUMMARY

One embodiment provides a filter for a fluid injection valve, comprising a filter sleeve, and a fastening element, wherein the fastening element comprises a fitting portion for fastening the filter in the fluid injection valve and a connection portion mechanically interacting with a first part of the filter sleeve for connecting the filter sleeve and the fastening element, and wherein the filter sleeve comprises a second part, the second part being arranged inside the fastening element and being disposed at a distance from the fitting portion of the fastening element, and wherein the fitting portion is resiliently moveable with respect to the connection portion.

In a further embodiment, the fitting portion is resiliently moveable in radial direction with respect to the connection portion.

In a further embodiment, the fastening element has a joint portion arranged between the connection portion and the fitting portion for resiliently connecting the fitting portion to the connection portion.

In a further embodiment, the filter has a longitudinal axis and extending along the longitudinal axis from a fluid inlet side to a fluid outlet side, wherein the second part of the filter sleeve axially overlaps the fitting portion of the fastening element and is radially spaced apart from the fitting portion.

In a further embodiment, the connection portion and the fitting portion are subsequently arranged in direction along the longitudinal axis.

In a further embodiment, the fitting portion laterally projects beyond the connection portion in top view along the longitudinal axis.

In a further embodiment, the fitting portion and the connection portion are spaced apart in radial direction.

In a further embodiment, at least one of the connection portion and the filter sleeve projects beyond the fitting portion in longitudinal direction towards the fluid inlet side.

In a further embodiment, the second part of the filter sleeve, the connection portion of the fastening element, and the fitting portion of the fastening element follow one another in this order in radially outward direction.

In a further embodiment, the fastening element is shaped as a cap in which at least the first part of the filter sleeve is received.

In a further embodiment, at least one of a welded connection, a press-fit connection and a form-fit connection is formed between the connection portion of the fastening element and the first part of the filter sleeve.

In a further embodiment, the filter sleeve a one-piece element which is made of a metal.

In a further embodiment, the fitting portion of the fastening element of the filter being press-fitted in an element of the fluid injection valve.

In a further embodiment, the fitting portion of the fasting element and the element comprise a common contact area and the filter sleeve is disposed at a distance from the element.

Another embodiment provides a method for mounting a filter in a fluid injection valve, comprising providing a filter sleeve, providing a separate fastening element, connecting the filter sleeve and the fastening element, such that a second part of the filter sleeve is arranged inside the fastening element and is disposed at a distance from a fitting portion of the fastening element, and press-fitting the fastening element in an element of the fluid injection valve, wherein the fitting portion is resiliently moved with respect to the connection portion during press-fitting the fastening element in the element of the fluid injection valve.

BRIEF DESCRIPTION OF THE DRAWINGS

Example embodiments of the filter and the fluid injection valve are explained below with reference to the drawings, in which.

DETAILED DESCRIPTION

Figure 1:
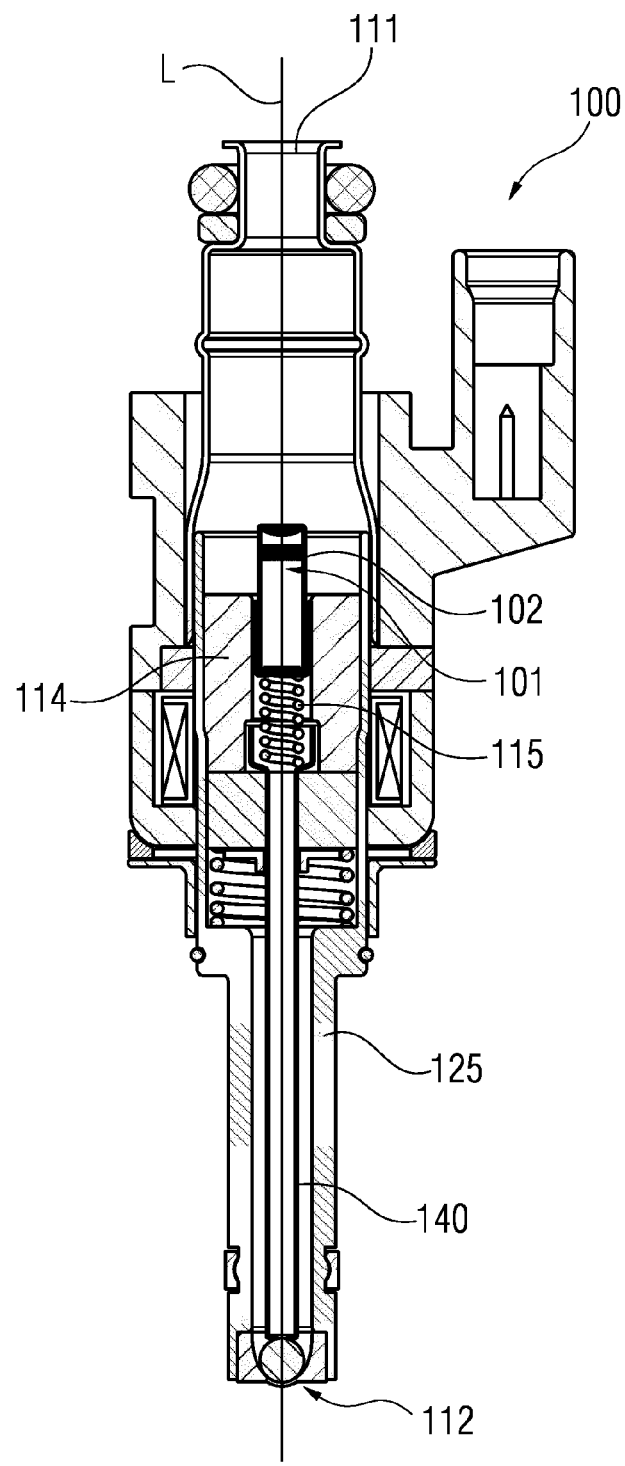
FIG. 1 shows a fuel injection valve with a filter in a longitudinal section view according to a first embodiment.

Embodiments of the present disclosure provide a filter for a fluid injection valve that is simple to be manufactured and which facilitates a reliable and precise function and a method for producing the filter.

A filter for a fluid injection valve is specified according to one aspect. A fluid injection valve comprising the filter is specified according to another aspect. The fluid injection valve preferably has an interior cavity which connects a fluid inlet end of the fluid injection valve to a fluid outlet end of the fluid injection valve. The filter may expediently be arranged in the interior cavity.

Preferably, the filter has a longitudinal axis and extends along the longitudinal axis from a fluid inlet side to a fluid outlet side. The longitudinal axis preferably coincides with a longitudinal axis of the fluid injection valve.

The filter comprises a filter sleeve and a fastening element. The filter sleeve and the fastening element are in particular separate pieces, i.e. they are in particular separately manufactured and subsequently assembled to produce the filter. They are in particular not "imaginary" portions of a continuous part but are separated by structural interfaces or the like.

The fastening element comprises a fitting portion for fastening the filter in the fluid injection valve. The fastening element further comprises a connection portion mechanically interacting with a first part of the filter sleeve for connecting the filter sleeve and the fastening element, i.e. in particular for positionally fixing the filter sleeve and the fastening element with respect to each other.

In particular, the fitting portion is operable to contact another component of the fluid injection valve when the filter is installed in the fluid injection valve, i.e. when the fluid injection valve is assembled. In particular, the filter is operable to establish a press-fit connection with the other component of the fluid injection valve, preferably by means of the fitting portion of the fastening element being in direct contact with the other component. The fastening element— in particular the fitting portion of the fastening element— and the other component preferably have a common contact area for establishing the press-fit connection.

With advantage, the filter may comprise a seat for a calibration spring of the fluid injection valve in this way. The calibration spring is in particular operable to bias a valve needle of the fluid injection valve towards a closing position. For example, the calibration spring forces the valve needle against a valve seat of the fluid injection valve.

In particular, the fitting portion laterally projects beyond the connection portion in top view along the longitudinal axis. In one embodiment, the fitting portion and the connection portion are spaced apart in radial direction. With advantage, the connection portion may be spaced apart from the other component of the fluid injection valve, with which the fitting portion is in direct contact. In an expedient embodiment, the fastening element extends in radial direction between the filter sleeve and another component of the fluid injection valve in the interior cavity.

In particular, the connection portion is located at the first part of the filter sleeve. For example the connection portion is in direct contact with the first part. In one embodiment, the fastening element is shaped as a cap in which at least the first part of the filter sleeve is received. Expediently, the cap may have a central opening for allowing fluid passage in axial direction through the cap. The opening in particular perforates a lid portion of the cap, the lid portion partially covering the filter sleeve in top view along the longitudinal axis.

The filter sleeve comprises a second part. It is conceivable that the first and second parts of the filter sleeve overlap or coincide. Preferably however, they are arranged subsequent to one another in longitudinal direction.

The second part is arranged inside the fastening element and is disposed at a distance from a fitting portion of the fastening element. Preferably, the second part of the filter sleeve axially overlaps the fitting portion of the fastening element and is radially—i.e. in particular perpendicular to the longitudinal axis—spaced apart from the fitting portion. In particular, the second part is radially spaced apart from the fitting portion in the axially overlapping region. Preferably, a fluid filled, radially extending gap is established between the second part of the filter sleeve and the fitting portion of the fastening element in the interior cavity of the fluid injection valve. For example, the second part of the filter sleeve, the connection portion of the fastening element, and the fitting portion of the fastening element follow one another in this order in radially outward direction, i.e. in direction away from the longitudinal axis.

Thus, a particularly constant and/or reproducible press-fitting force is achievable. Therefore, the calibration process of the injection valve, the calibration of injectors with the same calibration target and also the calibration of injectors with different calibration targets may be particularly precise.

In one embodiment, the connection portion and the fitting portion are subsequently arranged in direction along the longitudinal axis. In this way, a particularly precise adjustment of the press-fitting force for installing the filter in the injection valve may be achievable.

In one embodiment, the connection portion and/or the filter sleeve project(s) beyond the fitting portion in longitudinal direction towards the fluid inlet side. In this way, the filter may be easily accessible during calibration of the injection valve, for example when the fitting portion completely axially overlaps the other component of the injection valve with which it is in direct contact. The length of the filter sleeve and of the connection portion may be easy to adjust without affecting the press-fitting force of the fitting portion.

In one embodiment, the fitting portion is resiliently moveable with respect to the connection portion, in particular in radial direction. In one development, the fastening element has a joint portion arranged between the connection portion and the fitting portion for resiliently connecting the fitting portion to the connection portion. The joint portion may have an S-shaped or U-shaped cross-section, for example. Expediently, the fitting portion may be resiliently moved relative to the connection portion during establishment the press-fit connection with the other component of the fluid injection valve. The joint strength of the press-fit is in particular particularly well reproducible and/or adjustable in this way.

For example, a welded connection and/or a press-fitted connection is/are established between the connection portion of the fastening element and the first part of the filter sleeve. Thus, the manufacturing of the filter is inexpensive. In addition or alternatively, a form fit connection may be established between the connection portion of the fastening element and the first part of the filter sleeve. For example, the first part of the filter sleeve may interact with the lid portion of the cap to block axial movement of the filter sleeve with respect to the fastening element.

According to one embodiment the filter sleeve is formed integrally and consists of a metal. Therefore, the filter comprises a high chemical resistance against aggressive fluids, e.g. aggressive fuels. That the filter sleeve is formed integrally means in particular that it consists of a single piece; it is in particular not assembled from a plurality of separately manufactured parts. The filter sleeve itself—apart from its connection with the fastening element—is preferably free of brazed or welded joints, of adhesive joints, of overmolded parts and the like.

In one embodiment, the filter sleeve has a third part that comprises a multitude of filter holes reaching from an outside of the filter sleeve to an inside of the filter sleeve. In an expedient development, the first and second parts of the filter sleeve are unperforated by filter holes. Preferably, the third part of the filter sleeve is spaced apart from the other components of the fuel injection valve when the filter is installed in the fuel injection valve. The third part is preferably arranged axially subsequent to the second part, in particular on the side of the second part remote from the first part.

The third part preferably projects from the fastening element in axial direction. In this way, the risk is reduced that the fluid flow may be disturbed by the fastening element. For example, a particular large radial gap may be achievable between the third part of the filter sleeve and a side wall of the interior cavity of the fluid injection valve.

According to one embodiment, the filter holes of the multitude of filter holes have a mean diameter between 10 μm and 200 μm, preferably between 20 μm and 40 μm, the limits being included in each case. For example the mean diameter of the filter holes is approx. 30 μm.

According to one embodiment, the filter sleeve has the shape of a cylinder shell. One end base of the cylinder shell is closed in one embodiment. The opposite end base in particular has an opening. The multitude of filter holes penetrates at least a portion of a circumferential side wall of the cylinder shell. The end base having the opening is preferably comprised by the first part of the filter sleeve. In particular, the end base having the opening is arranged within the fastening element.

According to one embodiment, the filter sleeve comprises a projecting portion which is preferably comprised by the first part. The projecting portion in particular projects radially beyond the second part and/or beyond the third part. For example, the first part has a lateral edge portion which extends radially beyond the second part and/or beyond the third part—and in particular extends completely circumferentially around the second part and/or beyond the third part—in top view along the longitudinal axis. Thus, an outlet flow through the filter holes in a radial direction is achievable.

According to one embodiment, the fastening element is arranged at the fluid inlet side of the filter sleeve. For example, the cap is put over the fluid inlet side of the filter sleeve. In particular, it is put over the end base of the cylinder shell having the opening in such fashion that the opening of the lid portion of the cap and the opening of the end base of the filter sleeve overlap in top view along the longitudinal axis. According to an alternative embodiment, the fastening element is arranged on the fluid outlet side of the filter sleeve.

According to one embodiment, the fluid injection valve comprises a calibration spring. One end of the calibration spring is in contact with the fastening element. The fastening element is also used for preloading the calibration spring with a desired amount of spring force.

The filter sleeve is disposed at a distance from the other component of the fluid injection valve which has the common contact area with the fastening element. Therefore, the fixation of the filter sleeve in the element of the fluid injection valve is only realized by the fastening element. The filter sleeve preferably does not have a common contact area with any other component of the fluid injection valve except the fastening element.

In one embodiment, a trench is formed below the filter holes—i.e. in particular positioned subsequent to the filter holes in axial direction towards the fluid outlet side—in the interior cavity. The trench extends circumferentially around the second part and/or the third part of the filter sleeve in top view along the longitudinal axis. In one development, it is open towards the fluid inlet side. With advantage, the trench may be operable to accommodate residual particles which are filtered by the filter holes.

In one development, the surface of the trench comprises a portion of an outer circumferential surface of the filter sleeve and a portion of an inner circumferential surface of the fitting portion of the fastening element. In another development, the surface of the trench comprises a portion of an outer circumferential surface of the connecting portion of the fastening element and a portion of the circumferential inner surface of the fitting portion. The surface of the trench may also comprise a surface of the joint portion of the fastening element; in particular, a bottom surface of the trench is formed by the surface of the joint portion. According to a further aspect, a method for mounting a filter in a fluid injection valve comprises:

providing a filter sleeve,
providing a separate fastening element,
connecting the filter sleeve and the fastening element such that a second part of the filter sleeve is arranged inside the fastening element and is disposed at a distance from a fitting portion of the fastening element,
press-fitting the fastening element in an element of the fluid injection valve.

In a preferred embodiment of the method, the fitting portion is resiliently moved with respect to the connection portion during press-fitting the fastening element in the element of the fluid injection valve.

FIG. 1 shows a fluid injection valve 100 according to a first embodiment. The fuel injection valve 100 is in particular suitable for dosing fuel into an internal combustion engine of a vehicle, i.e. it is a fuel injection valve 100.

The fuel injection valve 100 comprises a valve body 125 with a central longitudinal axis L. The fuel injection valve 100 has an interior cavity 130 extending along the longitudinal axis L from a fuel inlet 111 to a fuel outlet 112 and hydraulically connects the fuel inlet 111 to the fuel outlet 112.

The fuel injection valve 100 comprises a valve needle 140 that can be actuated by an electromagnetic actuator. The valve needle 140 is in particular arranged within the valve body 125 in the interior cavity 130. The valve needle 140 can be moved within the fuel injection valve 100 along the central longitudinal axis L to prevent a fuel flow through a fuel outlet 112 in a closing position and releasing the fuel flow through the fuel outlet 112 in further positions.

In an operating state, fuel is provided by a fuel pump, for example via a fuel rail to a fuel inlet 111 of the fuel injection valve 100 and enters the interior cavity 130. From the fuel inlet 111 the fuel flow goes to a filter 101. The filter 101 filters the incoming fuel when it passes the filter 101. After passing the filter 101, the fuel flows further through the interior cavity 130 and/or through a recess of the valve needle 140 to the fuel outlet 112. When the valve needle 140 is displaced away from the closing position, fuel may leave the injection valve 100 through the fuel outlet 112.

The filter 101 is at least partly arranged in a pole piece 114 of the electromagnetic actuator. The pole piece 114 is received in the valve body 120 and positionally fixed with respect to the valve body 120. The interior cavity 130 is defined at least by the valve body 125 and the pole piece 114. Alternatively (not shown in the figures), the pole piece 114 can be in one piece with the valve body 120.

Figure 2:
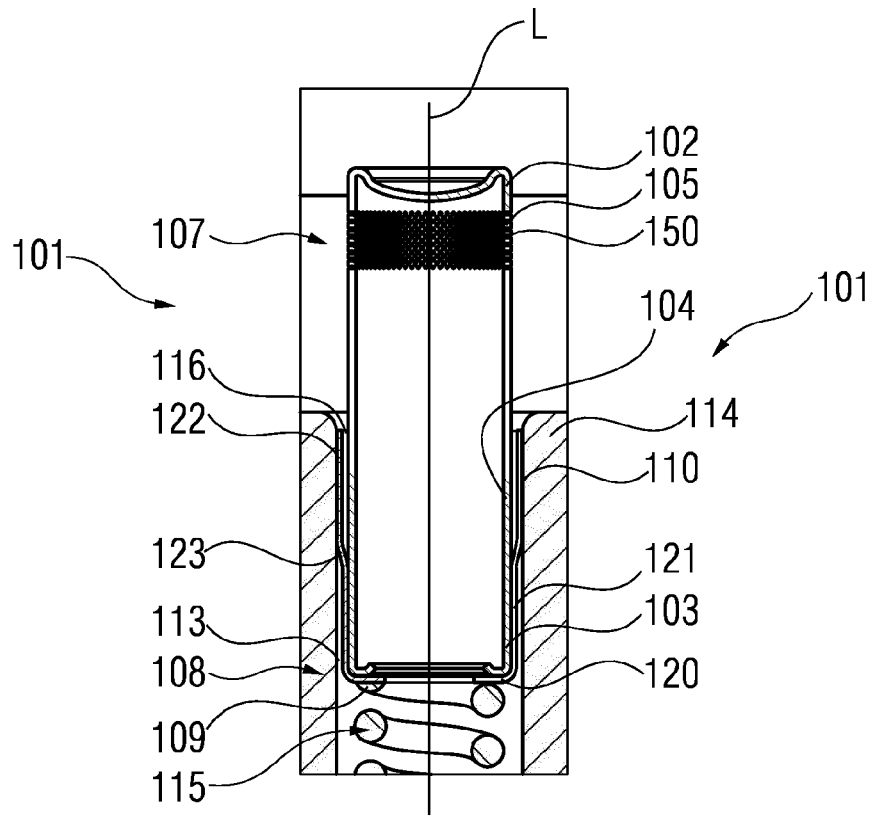
FIG. 2 shows an enlarged section of the filter of FIG. 1.

FIG. 2 shows an enlarged section of the injection valve 100 of FIG. 1 with the filter 101 in the pole piece 114. The longitudinal axis L of the injection valve 100 coincides with the longitudinal axis L of the filter 101. The filter extends along the longitudinal axis L from a fluid inlet side 107 to a fluid outlet side 108.

The filter 101 comprises a filter sleeve 102 and a separate fastening element 120. For example, the filter sleeve 102 is made of metal, for example stainless steel. For example, the fastening element 120 is made of metal, in particular stainless steel.

The filter sleeve 102 has a hollow cylindrical shape, i.e. it is in the shape of a cylinder shell, with a closed end base and an opening at an opposite end base. A lateral side of the filter sleeve 102 is directed along the longitudinal axis L; in other words, a circumferential side wall of the filter sleeve 102 extends along the longitudinal axis L from the closed end base to the opposite end base. For example, the filter sleeve 102 is provided by stamping or turning a metal body. The filter sleeve 102 is made in one piece.

The fastening element 120 is arranged inside the pole piece 114, in particular it is received in a central opening of the pole piece 114, the central opening of the pole piece 114 defining a portion of the interior cavity 130. Specifically, a fitting portion 122 of the fastening element 120 is press-fitted into an opening of the pole piece 114. The fitting portion 122 and the pole piece 114 comprise a common contact area 110 such that the pole piece 114 touches the fastening element 120.

The fastening element 120 has a connection portion 121 which is positioned subsequent to the fitting portion 122 in longitudinal direction L, in the present embodiment towards the fluid outlet side 108. In a region of the connection portion 121, the fastening element 120 is disposed at a distance 113 from the pole piece 114; in particular, the connection portion 121 is radially spaced apart from the pole piece 114. In this region, the pole piece 114 and the fastening element 120 have no contact with each other.

Between the fitting portion 122 in the region of the contact area 110 and the connection portion 121, being disposed at a distance 113 from the pole piece 114, the fastening element 120 has a joint portion 123. A cross-section of the joint portion 123 has an S-shape—i.e. in particular a shape having two subsequent, curved regions which are curved in opposite directions. The joint portion 123 resiliently couples the fitting portion 122 to the connection portion 121 so that a free end of the fitting portion 122, facing away from the joint portion 123, is resiliently displaceable in radial direction towards the filter sleeve 102. In one development, the fitting portion 122 may have axial cuts. By means of such axial cuts, circumferential compression due to the radial inward displacement of the free end of the fitting portion 122 may be avoided in particularly efficient fashion.

The fastening element 120 is in the shape of a cap which is put over a first part 103 and a second part 104 of the filter sleeve 102 so that the filter sleeve 102 is partly arranged inside of the fastening element 120. The filter sleeve 102 is coupled with the fastening element 120 by a connection which is established between the first part 103 of the filter sleeve 102 and the connection portion 121 of the fastening element 120. For example, a press-fit connection and/or a welded connection is/are established between the first part 103 of the filter sleeve 102 and the connection portion 121 of the fastening element 120.

In the present embodiment, the connection portion 121 has a lid section which partially covers the filter sleeve 102 in top view along the longitudinal axis. The lid section has a central opening that partially exposes the closed end base of the cylinder shell representing the filter sleeve 102 in top view along the longitudinal axis. By means of the lid section, the fastening element 120 is operable to block axial movement of the filter sleeve 102 relative to the fastening element 120 in longitudinal direction towards the fluid outlet side 108, i.e. the first part 103 is in form-fit engagement with the connection portion 121.

According to one embodiment, the filter sleeve 102 and the fastening element 120 are connected together before the fastening element 120 is press-fitted into the pole piece 114. In the region of the connection portion 121 the filter sleeve 102 and the fastening element 120 comprise a common contact area.

The second part 104 of the filter sleeve axially overlaps the fitting portion 122 of the fastening element 120. The second part 104 is disposed at a radial distance from the fastening element 120. The second part 104 of the filter sleeve 102 and a fitting portion 122 of the fastening element 120 have no contact with each other so that a fluid filled, radially extending gap is established between the second part 104 of the filter sleeve 102 and the fitting portion 122 of the fastening element 120 in the interior cavity 130 of the fluid injection valve 100.

In this way, a trench 116 is formed in the interior cavity 130. The trench 116 extends completely circumferentially around the second part 104 of the filter sleeve 102 in top view along the longitudinal axis L and is open towards the fluid inlet side 107. The surface of the trench 116 is defined by a portion of an outer circumferential surface of the second part 104 of the filter sleeve 102, a portion of an inner circumferential surface of the fitting portion 122 of the fastening element 120 and of a surface of the joint portion 123 of the fastening element 120.

The fastening element 120, specifically the connection portion 121 thereof, is in contact with one end 109 of a calibration spring 115. The opposite end of the calibration spring 115 is in contact with the valve needle 140. For example, the valve needle 140 has a collar with which the calibration spring 115 is in contact. The collar may be in one piece with a shaft of the valve needle 140 or it may be a separately manufactured part which is fixed to the shaft. The calibration spring 115 is arranged to exert a force onto the valve needle 140 in the direction of the longitudinal axis L. In this way, an adjusting fuel injection valve can be established. For manufacturing the fuel injection valve 100 the fastening element 120 is axially moved along the longitudinal axis L in order to exert the force on the valve needle 140 in the direction of the longitudinal axis L. This is to preload the calibration spring 115 with a desired amount of spring force. Thus, the force balance between the electromagnetic actuator and the calibration spring 115 can be precisely calibrated.

The fuel inlet side 107 and the filter holes 150 are arranged outside of the fastening element 120.

Due to the fastening element 120 that is arranged between the filter sleeve 102 and the pole piece 114, the press-fitting length between the filter 101 and the pole piece 114 is preserved constant. Further, the contact area between the fastening element 120 and the filter sleeve 102 is uncoupled from the contact area 110 for press-fitting the filter 101 onto the pole piece 114. Thus, the press-fitting force for coupling the filter 101 into the pole piece 114 is maintained roughly constant during the following conditions: during the calibration process of the fuel injection valve 100; among a multitude of different fuel injection valves with the same calibration target; among a multitude of different fuel injection valves with different calibration targets.

The filter sleeve 102 has a third part 105 which comprises a multitude of filter holes 150. For example, the filter holes 150 are brought into the circumferential side wall of the filter sleeve 102 by one of laser drilling, electrical discharge machining or punching. In the present embodiment, the filter holes 150 have a mean diameter of 30 μm.

The third part 105 is arranged axially subsequent to the second part 104 on the side of the second part 104 remote from the first part 103. The third part 105 projects from the fastening element 120 in axial direction. In the present embodiment, the third part 105 with the filter holes 150 is arranged at the fuel inlet side 107 of the filter sleeve 102 The third part 105 of the filter sleeve 102 projects beyond the pole piece 114 in direction towards the fuel inlet 111 while the fitting portion 122 completely axially overlaps the pole piece 114 which it is in direct contact.

The first and second parts 103, 104 are not perforated by filter holes 150. Thus, the filter holes 105 precede the trench 116 in axial direction towards the fluid outlet side and in the region of the trench 116, the filter sleeve 102 is unperforated. In this way, the trench 116 may be operable to accommodate residual particles filtered by the filter holes 150 without blocking the filter holes 150.

Fuel from the fuel inlet 111 reaches the filter sleeve 102 outside of the filter sleeve 102 and enters an inside of the filter sleeve 102 through the filter holes 150. The fuel leaves the inside of the filter sleeve 102 through the opening at the end base, passes the fastening element 120 via the central opening in the lid section of the connection portion 121 and flows to the fuel outlet 112.

Since the filter sleeve 102 is attached to the pole piece 114 by the fastening element 120, the press-fitting length between the filter 101 and the pole piece 114 is preserved constant. Furthermore, connection of the fastening element 120 with the filter sleeve 102 is independent from the contact area 110 for press-fitting of the filter 101 into the pole piece 114.

Figure 3:
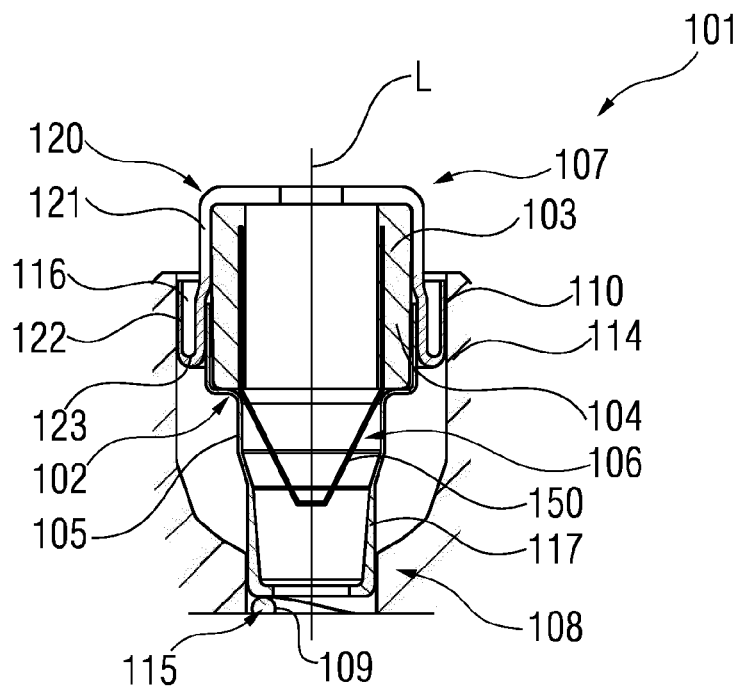
FIG. 3 shows a longitudinal section view of a filter according to a second embodiment.

FIG. 3 shows a filter 101 according to a second exemplary embodiment in a section view.

In contrast to the first embodiment, the filter sleeve 102 is not a metallic one-piece part. Rather, it comprises a plastic filter screen 106 with the filter holes 150.

Further, the fastening element 120 is arranged at the fuel inlet side 107 of the filter sleeve 102. The fuel from the fuel inlet 111 goes through the central opening of the lid section of the connection portion 121 of the fastening element 120 and after that to the inside of the filter sleeve 102.

The first part 103 of the filter sleeve 102 and the connection portion 121 of the fastening element 120 comprise a common contact area where they are connected by means of a press-fit connection, for example, so that the first part 103 of the filter sleeve 102 and the connection portion 121 of the fastening element 120 are in contact with each other. The first part 103 of the filter sleeve 102 and the connection portion 121 of the fastening element 120 project beyond the pole piece 114 in longitudinal direction L towards the fuel inlet 111.

As in the first embodiment, the fastening element 120 is in the shape of a cap which is put over the first part 103 and over a second part 104 of the filter sleeve 102. In the present embodiment, however, the cap is put over the filter sleeve 102 from the fuel inlet side 107 rather than from the fuel outlet side 108.

The second part 104 of the filter sleeve axially overlaps the fitting portion 122 of the fastening element 120. In the overlapping region, the fastening element 120 and the fitting portion 122 of the filter sleeve 102 are disposed at the distance from each other. In the present exemplary embodiment the second part 104 of the filter sleeve 102 also axially overlaps the connection portion 121 of the fastening element 120 so that the second part 104 of the filter sleeve 102, the connection portion 121 of the fastening element 120 and the fitting portion 122 of the fastening element 120 follow one another in this order in radially outward direction, i.e. in direction away from the longitudinal axis. In the overlapping region, the connection portion 121 and the fitting portion 122 are radially spaced apart. In this way, a radial gap is defined which is closed at its end facing towards the fuel outlet side 108 by the joint portion 123 so that a trench 116 is defined. A bottom surface of the trench 116 is formed by the surface of the joint portion 123. In the present embodiment, the joint portion 123, which resiliently couples the connection portion 121 to the fitting portion 122, has a U-shaped cross-section.

The filter sleeve 102 comprises a metallic shell 117 which projects beyond the fastening element 120 and the plastic filter screen 106 in direction towards the fuel outlet side 108. In this way, a portion of the metallic shell 117, and a portion of the filter screen 106, as the case may be, represent a third part 105 of the filter sleeve 102 which projects axially beyond the fastening element 120. The first and second parts 103, 104 represent a projecting portion of the filter sleeve 102 which radially projects beyond the third part 105. The metallic shell 117 is in contact with the end 109 of the calibration spring 115 for preloading the calibration spring 115 as described above.

The filter sleeve 102 according to the present exemplary embodiment has openings at both axial end bases. While the fuel may enter the inside of the filter sleeve 102 flowing in radial direction through the filter holes 150 and may flow further through the filter sleeve 102 in axial direction towards the fuel outlet side 102 to leave the filter 101 in axial direction through the opening in the lid portion of the fastening element 120, the fuel in the present embodiment may enter the filter 101 through the opening in the lid portion in axial direction and may leave the filter sleeve 102 through a bottom opening of the metallic shell 117 also in axial direction after passing the plastic filter screen 106.

What is claimed is:
1. A filter for a fluid injection valve, the filter comprising:
a filter sleeve comprising a first part and a second part, and
a fastening element comprising:
  a fitting portion for fastening the filter in the fluid injection valve, and
  a connection portion mechanically interacting with the first part of the filter sleeve for connecting the filter sleeve and the fastening element,
wherein the second part of the filter sleeve is arranged inside the fastening element and disposed at a distance from the fitting portion of the fastening element, and wherein the fitting portion is resiliently moveable with respect to the connection portion.

2. The filter of claim 1, wherein the fitting portion is resiliently moveable in a radial direction with respect to the connection portion.

3. The filter of claim 2, wherein the fastening element has a joint portion arranged between the connection portion and the fitting portion for resiliently connecting the fitting portion to the connection portion.

4. The filter of claim 1, comprising a longitudinal axis and extending along the longitudinal axis from a fluid inlet side to a fluid outlet side, wherein the second part of the filter sleeve axially overlaps the fitting portion of the fastening element and is radially spaced apart from the fitting portion.

5. The filter of claim 4, wherein the connection portion and the fitting portion are subsequently arranged in direction along the longitudinal axis.

6. The filter of claim 4, wherein the fitting portion laterally projects beyond the connection portion in top view along the longitudinal axis.

7. The filter of claim 6, wherein the fitting portion and the connection portion are spaced apart in radial direction.

8. The filter of claim 4, wherein at least one of the connection portion or the filter sleeve projects beyond the fitting portion in a longitudinal direction towards the fluid inlet side.

9. The filter of claim 4, wherein the second part of the filter sleeve, the connection portion of the fastening element, and the fitting portion of the fastening element are arranged in order in a radially outward direction.

10. The filter of claim 1, wherein the fastening element is shaped as a cap in which at least the first part of the filter sleeve is received.

11. The filter of claim 1, wherein at least one of a welded connection, a press-fit connection, or a form-fit connection is formed between the connection portion of the fastening element and the first part of the filter sleeve.

12. The filter of claim 1, wherein the filter sleeve is a one-piece element formed of a metal.

13. A fluid injection valve, comprising:
a filter comprising:
  a filter sleeve comprising a first part and a second part, and
  a fastening element comprising:
    a fitting portion for fastening the filter in the fluid injection valve, and
    a connection portion mechanically interacting with the first part of the filter sleeve for connecting the filter sleeve and the fastening element,
  wherein the second part of the filter sleeve is arranged inside the fastening element and disposed at a distance from the fitting portion of the fastening element, and
  wherein the fitting portion is resiliently moveable with respect to the connection portion,
wherein the fitting portion of the fastening element of the filter is press-fitted in an element of the fluid injection valve.

14. The fluid injection valve of claim 13, wherein the fitting portion of the fasting element and the element comprise a common contact area, and the filter sleeve is disposed at a distance from the element.

15. A method for mounting a filter in a fluid injection valve, the method comprising:
providing a filter sleeve comprising a first part and a second part,
providing a fastening element separate from the filter sleeve,
connecting the filter sleeve and the fastening element such that the second part of the filter sleeve is arranged inside the fastening element and is disposed at a distance from a fitting portion of the fastening element,
press-fitting the fastening element in an element of the fluid injection valve, and
resiliently moving the fitting portion is with respect to the connection portion during press-fitting the fastening element in the element of the fluid injection valve.

* * * * *